United States Patent Office 3,236,625
Patented Feb. 22, 1966

3,236,625
METHOD OF INHIBITING PLANT GROWTH
David X. Klein, Upper Montclair, and Theodore A. Girard, Wayne, N.J., assignors, by mesne assignments, to Tenneco Chemicals, Inc., a corporation of Delaware
No Drawing. Filed July 18, 1963, Ser. No. 296,101
13 Claims. (Cl. 71—2.6)

The present invention relates to new herbicidal compositions and to methods of preventing plant growth and also is concerned with novel compounds useful as herbicides.

This application is a continuation-in-part of our copending application Serial No. 736,993, filed May 22, 1958, now abandoned.

The present herbicidal compounds are tetra- and penta-substituted benzoic acids, that is, the benzoic acid has four or five substituents on the benzene ring. One of the substituents is a methyl group and the other substituents are chlorine atoms. These substituted benzoic acids have the following structural formula:

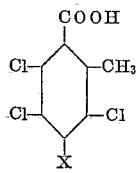

wherein X represents Cl or H. Of the two acids involved, 2-methyl-3,5,6-trichlorobenzoic acid is preferred.

The herbicidal compounds may be applied as the acid or as a derivative of the acid. The derivatives may be a salt or amide of the acids. Representative salts of these substituted benzoic acids include the alkali metal salts, such as the sodium or potassium salt; the ammonia salt; the alkaline earth salts, for example, the calcium or barium salts; the iron or aluminum salts; and the amine salts of amines such as the primary, secondary, and tertiary alkylamines and the mono-, di-, and trialkyl-amines including ethanolamine, diethanolamine, and triethanolamine. Water soluble salts, such as the sodium salt or the dimethylamine salt of the acid, are preferred where water solubility is desirable; however, the water insoluble salts may be used. The amides, for example, 2-methyl-3,5,6-benzamide, may be used.

These compounds, either as the acid or the salt or amide of the acid, may be applied to the area normally supporting plant growth and may be applied to the plants in the area or to the soil or other medium supporting plant growth in the area before or after the emergence of plant growth. The herbicide may be applied in relatively large dosages to inhibit or prevent all or substantially all plant growth in the area. Generally, relatively low dosages may be used to inhibit the growth of some plants more than others, that is, selective control of plant growth.

While the herbicidal compound may be applied as such, it preferably is used with a carrier. It may be distributed over the area in the form of an emulsion or solution or in the form of a dust comprising a finely-divided solid carrier mixed with or having deposited thereon the herbicide. The concentration of the substituted benzoic acid or its derivative in the herbicidal composition may vary widely and depends on a number of factors, the most important of which are the amount of composition applied per unit of area and type or types of plants being treated. Mixtures of the various substituted benzoic acids may be used and other herbicides may be incorporated in the herbicidal compositions.

The present substituted benzoic acids may be prepared using known chemical procedures and may be prepared in such a manner as to obtain a compound in pure form or mixed with its isomers and/or other substituted benzoic acids. For example, ortho-xylene can be nuclear chlorinated with gaseous chlorine, preferably in the presence of a nuclear chlorination catalyst, for example, iron filings, until the weight increase corresponds to about 3 gram atoms of chlorine per gram mole of ortho-xylene. The product is mainly trichlorodimethyl-benzene containing some di- and tetra-chloro compounds which may, if desirable, be separated readily by fractional distillation. The trichlorodimethyl-benzene can be side-chain chlorinated with gaseous chlorine until the weight increase corresponds to one gram atom of chlorine per gram mole. The resulting trichloromonomethylbenzyl chloride can be readily reacted with sodium acetate to form the ester and the benzyl ester can be treated with concentrated nitric acid to form the corresponding acid. The nuclear chlorination step will produce a mixture of isomers and the resulting monomethyltrichlorobenzoic acid will be a mixture of isomers which can be separated, for example, by esterifying the acids with an aliphatic alcohol and then separating the benzoate esters. The purified ester can be hydrolyzed with HCl to form the corresponding benzoic acid. The course of this procedure for producing 2-methyl-3,5,6-trichlorobenzoic acid can be summarized as follows:

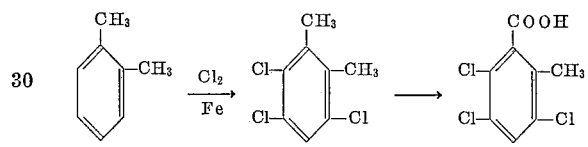

The other isomers produced to some extent at the same time are 6-methyl-2,3,4-trichlorobenzoic acid, 2-methyl-3,4,6-trichlorobenzoic acid and 2-methyl-4,5,6-trichlorobenzoic acid. When o-xylene is tetrachlorinated and one of the methyl groups is replaced by a carboxyl group, the product is 2-methyl-3,4,5,6-tetrachlorobenzoic acid.

Toluene may be converted to the acid by incorporation of a carboxyl radical. For example, toluene can be monobromated with bromine to form o- and p-bromo toluene. These isomers can be separated by distillation. Nuclear trichlorination of the orthobromo toluene will produce 2-bromo-trichlorotoluene including the isomer 2-bromo-3,4,6-trichloro-methyl benzene. By the Grignard reaction utilizing magnesium followed by treatment with $CO_2$ gas in the presence of $H_2O$, the bromine atom is replaced with a carboxyl group thereby producing a mixture of isomers of 2-methyl trichlorobenzoic acid including the isomer, 2-methyl-3,5,6-trichlorobenzoic acid.

The salts and amides of the present substituted benzoic acids can be produced quite readily by the known procedures followed in forming these derivatives of benzoic acid. For example, the present substituted benzoic acids readily react with sodium hydroxide in aqueous solution to form an aqueous solution of the sodium salt. Similarly, the amines readily react with the present acids to form salts. Metal salts also can be produced, for example, by reacting the sodium salt of the substituted benzoic acid with a metal chloride such as manganese chloride, calcium chloride, basic zinc chloride, etc.

Germination tests were carried out utilizing the species of seeds, buckwheat, cucumber, and rape grown on moist paper in Petri dishes. Methyl tetrachlorobenzoic acid as its sodium salt and the dimethylamine salt of methyl-trichlorobenzoic acid were used as herbicides, both of which were prepared by the nuclear chlorination of o-xylene followed by the conversion of one of the methyl groups to a carboxyl group. The herbicides were used as dilute aqueous solutions containing 1, 10, 100, and 1000 parts per million of herbicide, calculated as the acid.

In other words, an amount of salt was used equivalent to the dosage amount of acid. Fifteen ml. of solution was used; thus, there was applied 0.015, 0.15, 1.5, and 15 mg. equivalent acid per dish.

The dimethylamine salt of methyl-trichlorobenzoic acid was prepared from a non-purified acid containing about 62% of methyltrichlorobenzoic acid and 26% methyl-tetrachlorobenzoic acid. The methyl trichlorobenzoic acid contained a substantial amount of 2-methyl-3,5,6-trichlorobenzoic acid. The sodium salt was prepared from methyl-tetrachlorobenzoic acid primarily composed of 2-methyl-3,4,5,6-tetrachlorobenzoic acid. The degree of inhibition of root and shoot development of seedlings developed from seeds treated with the herbicides and as observed after a 5-day incubation period is set forth in the following table. In this table "R" refers to root system and "S" refers to shoot. The numbers "0" to "5" indicate increasing effectiveness as determined by comparison with germination tests conducted at the same time and in the same sanner except for the omission of the herbicide. The term "Tri" indicates the methyl-trichlorobenzoic acid and "Tetra" indicates the methyl-tetrachlorobenzoic acid.

| Buckwheat | | | | |
|---|---|---|---|---|
| | 1 p.p.m. | | 10 p.p.m. | |
| | R | S | R | S |
| Tri | 0 | 0 | 2 | 2 |
| Tetra | 0 | 0 | 0 | 0 |
| | 100 p.p.m. | | 1,000 p.p.m. | |
| | R | S | R | S |
| Tri | 4 | 3 | 5 | 4 |
| Tetra | 1 | 1 | 4 | 4 |

| Cucumber | | | | |
|---|---|---|---|---|
| | 1 p.p.m. | | 10 p.p.m. | |
| | R | S | R | S |
| Tri | 0 | 0 | 2 | 2 |
| Tetra | 0 | 0 | 0 | 0 |
| | 100 p.p.m. | | 1,000 p.p.m. | |
| | R | S | R | S |
| Tri | 4 | 3 | 5 | 5 |
| Tetra | 2 | 2 | 5 | 5 |

| Rape | | | | |
|---|---|---|---|---|
| | 1 p.p.m. | | 10 p.p.m. | |
| | R | S | R | S |
| Tri | 0 | 0 | 1 | 2 |
| Tetra | 0 | 0 | 0 | 0 |
| | 100 p.p.m. | | 1,000 p.p.m. | |
| | R | S | R | S |
| Tri | 4 | 4 | 5 | 5 |
| Tetra | 2 | 2 | 5 | 5 |

A second series of germination tests were carried out utilizing oat, tomato, and lettuce seeds. The conditions were the same as previously described and the same herbicides were used, that is, the sodium salt of the methyl-tetrachlorobenzoic acid and the dimethylamine salt of the methyl-trichlorobenzoic acid described in the previous seed germination tests. The same dosages were used and the results are set forth in the following table with the same abreviations and symbols being used.

| Oats | | | | |
|---|---|---|---|---|
| | 1 p.p.m. | | 10 p.p.m. | |
| | R | S | R | S |
| Tri | 0 | 0 | 0 | 0 |
| Tetra | 0 | 0 | 0 | 0 |
| | 100 p.p.m. | | 1,000 p.p.m. | |
| | R | S | R | S |
| Tri | 1 | 1 | 4 | 3 |
| Tetra | 0 | 0 | 1 | 1 |

| Tomato | | | | |
|---|---|---|---|---|
| | 1 p.p.m. | | 10 p.p.m. | |
| | R | S | R | S |
| Tri | 0 | 0 | 0 | 0 |
| Tetra | 0 | 0 | 0 | 0 |
| | 100 p.p.m. | | 1,000 p.p.m. | |
| | R | S | R | S |
| Tri | 1 | 1 | 5 | 5 |
| Tetra | 0 | 0 | 5 | 5 |

| Lettuce | | | | |
|---|---|---|---|---|
| | 1 p.p.m. | | 10 p.p.m. | |
| | R | S | R | S |
| Tri | 0 | 0 | 3 | 3 |
| Tetra | 0 | 0 | 0 | 0 |
| | 100 p.p.m. | | 1,000 p.p.m. | |
| | R | S | R | S |
| Tri | No germination | | No germination | |
| Tetra | No germination | | No germination | |

The present substituted benzoic acids are, in general, more effective against dicotyledonous (broad-leafed) plants than against monocotyledonous (grassy) plants. These compounds also have a hormonal effect on the grassy plants, especially at the relatively higher dosages.

EXAMPLE

Two quantities of methyl-polychlorobenzoic acids were prepared by the chlorination of o-toluic acid. The two quantities of acids had the following analysis, by weight:

| Acid | A | B |
|---|---|---|
| Methyl-dichlorobenzoic acid | 2.5% | 1% |
| 2-methyl-3,5,6-trichlorobenzoic acid | 75.0% | 65% |
| 2-methyl-4,5,6-trichlorobenzoic acid | 11.0% | 10% |
| 2-methyl-3,4,5,6-tetrachlorobenzoic acid | 11.0% | 24% |

Portions of A and B were reacted with sodium hydroxide and the resulting sodium salts in aqueous solution were tested both pre-emergence and post-emergence against a variety of seeds and plants in flats at a dosage of 10 pounds per acre, acid equivalent. Dichlorophenoxyacetic acid (2,4-D) was applied to flats at a dosage of 4 pounds per acre. The controls were untreated flats containing the same kinds of seed without any herbicide.

Pre-emergence injury rating

| Herbicide | Seed | | | | | |
|---|---|---|---|---|---|---|
| | Corn | Clover | Wheat | Oats | Onions | Soybeans |
| A | 0 | 10 | 0 | 0 | 10 | 10 |
| B | 0 | 10 | 0 | 0 | 10 | 10 |
| 2,4-D | 0 | 10 | 0 | 0 | 10 | 10 |
| None | 0 | 0 | 0 | 0 | 0 | 0 |

| Herbicide | Seed | | | | | |
|---|---|---|---|---|---|---|
| | Rye Grass | Mustard | Morning Glory | Buckwheat | Crab Grass | Yellow Foxtail |
| A | 0 | 10 | 10 | 0 | 0 | 0 |
| B | 0 | 10 | 10 | 10 | 0 | 0 |
| 2,4-D | 0 | 10 | 10 | 10 | 0 | 0 |
| None | 0 | 0 | 10 | 0 | 0 | 0 |

Post-emergence injury rating

| Herbicide | Seed | | | | | |
|---|---|---|---|---|---|---|
| | Corn | Clover | Wheat | Oats | Onions | Soybeans |
| A | 0 | 0 | 0 | 0 | 8 | 8 |
| B | 0 | 10 | 0 | 5 | 10 | 10 |
| 2,4-D | 0 | 10 | 0 | 0 | 10 | 0 |
| None | 0 | 0 | 0 | 0 | 0 | 0 |

| Herbicide | Seed | | | | | |
|---|---|---|---|---|---|---|
| | Rye Grass | Mustard | Morning Glory | Buckwheat | Crab Grass | Yellow Foxtail |
| A | 0 | 5 | 0 | 0 | 0 | 0 |
| B | 3 | 10 | 10 | 10 | 0 | 0 |
| 2,4-D | 0 | 10 | 9 | 8 | 0 | 0 |
| None | 0 | 0 | 0 | 0 | 0 | 0 |

All observations were made 14 days after treatment. Injury rating scale was as follows:

0 = no effect
1, 2, 3 = slight injury, plant usually recovered with little or no reduction in top growth
4, 5, 6 = moderate injury, plants usually recovered but with reduced top growth
7, 8, 9 = severe injury, plants usually did not recover
10 = all plants killed Methyl-trichlorobenzoic acids and methyl-tetrachlorobenzoic acids can be separated from mixtures thereof by distillation. Thus, the trichloro- and tetrachloro- fractions of either mixtures of acids of the last example could have been separated to provide substantially pure 2-methyl-3,4,5,6-tetrachlorobenzoic acid and a quantity of methyl-trichlorobenzoic acid containing about 87% 2-methyl-3,5,6-trichlorobenzoic acid and about 13% 2-methyl-4,5,6-trichlorobenzoic acid which is relatively ineffective. While 2-methyl-3,4,5,6-tetrachlorobenzoic acid is not as effective as 2-methyl-3,5,6-trichlorobenzoic acid, and tetra-chloro-acid is surprisingly effective as it has a chlorine atom in the 4-position and other methyl-polychlorobenzoic acids and poly-chlorobenzoic acids which have a chlorine atom in the 4-position on the ring are relatively ineffective.

When 2-methyl-3,5,6-trichlorobenzoic acid is produced by a process involving the nuclear trichlorination of a substituted toluene, there also is produced a minor amount of 2-methyl-3,4,5,6-tetrachlorobenzoic acid. This minor amount normally will constitute at least 5% of the total weight of these two acids when the chlorination step is continued to yield the maximum amount of trichloro- compound. In view of the fact that 2-methyl-3,4,5,6-tetrachlorobenzoic acid is a herbicide, it usually is preferable not to separate the methyl-tetrachlorobenzoic acid.

We claim:

1. The method of inhibiting plant growth in an area normally supporting plant growth comprising applying to the area a toxic amount of herbicide selected from the group consisting of nuclear substituted benzoic acids having the formula

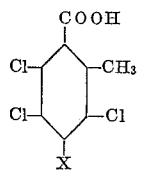

wherein X represents a member selected from the group consisting of Cl and H; the alkali metal salts, the alkaline earth metal salts, the iron salts, the aluminum salts, and the ammonium salts of said acids; the water soluble monoalkylamine, dialkylamine and trialkylamine salts of said acids; and the ethanolamine, diethanolamine and triethanolamine salts of said acids.

2. The method of inhibiting the growth of weeds in a corn crop comprising applying to such an area a herbicide in an amount toxic to the weeds, said herbicide being selected from the group consisting of nuclear substituted benzoic acids having the formula

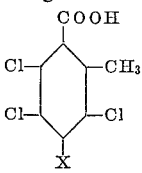

wherein X represents a member selected from the group consisting of Cl and H; the alkali metal salts, the alkaline earth metal salts, the iron salts, the aluminum salts, and the ammonium salts of said acids; the water soluble monoalkylamine, dialkylamine and trialkylamine salts of said acids; and the ethanolamine, diethanolamine and triethanolamine salts of said acids.

3. The method of inhibiting plant growth in an area normally supporting plant growth comprising applying to such an area a toxic amount of 2-methyl-3,5,6-trichlorobenzoic acid.

4. The method of inhibiting plant growth in an area normally supporting plant growth comprising applying to such an area a toxic amount of the alkali metal salt of 2-methyl-3,5,6-trichlorobenzoic acid.

5. The method of inhibiting plant growth in an area normally supporting plant growth comprising applying to such an area a toxic amount of the dimethylamine salt of 2-methyl-3,5,6-trichlorobenzoic acid.

6. The method of inhibiting plant growth in an area normally supporting plant growth comprising applying to such an area a toxic amount of the sodium salt of 2-methyl-3,5,6-trichlorobenzoic acid.

7. The method of inhibiting plant growth in an area normally supporting plant growth comprising applying to such an area a toxic amount of the ammonium salt of 2-methyl-3,5,6-trichlorobenzoic acid.

8. The method of inhibiting plant growth in an area normally supporting plant growth comprising applying to such an area a toxic amount of the diethanolamine salt of 2-methyl-3,5,6-trichlorobenzoic acid.

9. The method of inhibiting plant growth in an area normally supporting plant growth comprising applying to such an area a toxic amount of the water soluble monoalkylamine salt of 2-methyl-3,5,6-trichlorobenzoic acid.

10. The method of inhibiting plant growth in an area normally supporting plant growth comprising applying to such an area a toxic amount of the water soluble dialkylamine salt of 2-methyl-3,5,6-trichlorobenzoic acid.

11. The method of inhibiting plant growth in an area normally supporting plant growth comprising applying to such an area a toxic amount of the ethanolamine salt of 2-methyl-3,5,6-trichlorobenzoic acid.

12. The method of inhibiting plant growth in an area normally supporting plant growth comprising applying to such an area a toxic amount of the sodium salt of 2-methyl-3,4,5,6-tetrachlorobenzoic acid.

13. The method of inhibiting plant growth in an area normally supporting plant growth comprising applying to such an area a toxic amount of the dimethylamine salt of 2-methyl-3,4,5,6-tetrachlorobenzoic acid.

References Cited by the Examiner

UNITED STATES PATENTS

| | | | |
|---|---|---|---|
| 1,891,677 | 12/1932 | Laska et al. | 260—521 |
| 2,312,864 | 3/1943 | Bindler | 260—521 |
| 2,522,488 | 9/1950 | Bersworth | 260—501 |
| 2,590,815 | 3/1952 | Dosser et al. | 260—501 |
| 3,005,694 | 10/1961 | Entemann | 71—2.6 |
| 3,013,873 | 12/1961 | Hart et al. | 71—2.6 |
| 3,118,756 | 1/1964 | Richter | 71—2.6 |
| 3,156,553 | 11/1964 | Searle | 71—2.6 |

OTHER REFERENCES

Miller, Weeds, vol. 1, No. 2, pages 185 to 188, 1952.

Wain et al., The Chemistry and Mode of Action of Plant Growth Regulants, Butterworths Scientific Publications, London, 1956, pages 117 to 121.

LEWIS GOTTS, *Primary Examiner.*

LORRAINE A. WEINBERGER, JULIAN S. LEVITT,
*Examiners.*

BRUCE M. EISEN, JAMES O. THOMAS, Jr.,
*Assistant Examiners.*